US007692657B2

(12) United States Patent
Gauthier

(10) Patent No.: US 7,692,657 B2
(45) Date of Patent: Apr. 6, 2010

(54) ANIMATION EDITING APPARATUS

(75) Inventor: Andre Gauthier, St-Jacques Le Mineur (CA)

(73) Assignee: Autodesk, Inc., San Rafael, CA (US)

( * ) Notice: Subject to any disclaimer, the term of this patent is extended or adjusted under 35 U.S.C. 154(b) by 673 days.

(21) Appl. No.: 10/313,170

(22) Filed: Dec. 6, 2002

(65) Prior Publication Data
US 2004/0012640 A1 Jan. 22, 2004

(30) Foreign Application Priority Data
Jul. 19, 2002 (GB) ................. 0216814.4

(51) Int. Cl.
G06T 15/70 (2006.01)

(52) U.S. Cl. .................................... 345/473

(58) Field of Classification Search ......... 345/473–475, 345/419
See application file for complete search history.

(56) References Cited

U.S. PATENT DOCUMENTS

| 5,261,041 | A | * | 11/1993 | Susman ....................... 345/473 |
| 5,267,154 | A | * | 11/1993 | Takeuchi et al. ............. 345/473 |
| 5,347,306 | A | * | 9/1994 | Nitta .......................... 348/14.1 |
| 5,483,630 | A | * | 1/1996 | Unuma et al. ................ 345/475 |
| 5,511,158 | A | * | 4/1996 | Sims .......................... 345/440 |
| 5,546,518 | A | * | 8/1996 | Blossom et al. ............. 345/473 |
| 5,577,185 | A | * | 11/1996 | Tunnell et al. ............... 345/473 |
| 5,619,632 | A | * | 4/1997 | Lamping et al. ............. 345/441 |
| 5,717,848 | A | * | 2/1998 | Watanabe et al. ........... 345/474 |
| 5,786,814 | A | * | 7/1998 | Moran et al. ................ 715/720 |
| 5,896,139 | A | * | 4/1999 | Strauss ....................... 345/440 |
| 5,907,704 | A | * | 5/1999 | Gudmundson et al. ...... 717/100 |
| 6,049,805 | A | * | 4/2000 | Drucker et al. .............. 707/102 |
| 6,189,012 | B1 | * | 2/2001 | Mital et al. ............. 707/103 R |
| 6,237,006 | B1 | * | 5/2001 | Weinberg et al. ........ 707/103 R |
| 6,329,994 | B1 | * | 12/2001 | Gever et al. ................. 345/473 |
| 6,337,700 | B1 | * | 1/2002 | Kinoe et al. ................. 715/854 |
| 6,373,484 | B1 | * | 4/2002 | Orell et al. .................. 345/420 |
| 6,437,784 | B1 | * | 8/2002 | Bentley et al. .............. 345/473 |
| 6,567,070 | B1 | * | 5/2003 | Light et al. ................. 345/157 |
| 6,701,313 | B1 | * | 3/2004 | Smith ........................... 707/6 |
| 6,714,201 | B1 | * | 3/2004 | Grinstein et al. ............ 345/474 |

(Continued)

OTHER PUBLICATIONS

"A Framework for the Structured Design of VR/AR Content"; Paelke et. al., 2000, ACM 1-58113-316-2/00/0010.*

(Continued)

Primary Examiner—Peter-Anthony Pappas
(74) Attorney, Agent, or Firm—Staas & Halsey LLP

(57) ABSTRACT

Animation editing apparatus for editing animation data, comprising data storage means, processing means, visual display means and a manually responsive input device configured to allow a user to indicate a selected point on the visual display means.

The visual display means displays an image representing a simulated three-dimensional world-space including a plurality of simulated objects, and the manually responsive input device provides an input signal indicating a location within the image corresponding to one of the simulated objects. In response to receiving the input signal, the processing means identifies the selected simulated object, and retrieves data from the data storage means of one or more related items related to the selected simulated object within a defined degree of relationship. The visual display means displays labels identifying the selected simulated object and the related items only.

22 Claims, 18 Drawing Sheets

U.S. PATENT DOCUMENTS

| | | | |
|---|---|---|---|
| 6,741,242 B1 * | 5/2004 | Itoh et al. | 345/419 |
| 6,801,916 B2 * | 10/2004 | Roberge et al. | 707/101 |
| 7,061,486 B2 * | 6/2006 | Sowizral et al. | 345/420 |
| 7,106,334 B2 * | 9/2006 | Imagawa et al. | 345/474 |
| 7,292,243 B1 * | 11/2007 | Burke | 345/440 |
| 2001/0035873 A1 * | 11/2001 | Easter | 345/632 |
| 2002/0111932 A1 * | 8/2002 | Roberge et al. | 707/1 |
| 2003/0011601 A1 * | 1/2003 | Itoh et al. | 345/440 |
| 2003/0076336 A1 * | 4/2003 | Fukao et al. | 345/589 |
| 2003/0191765 A1 * | 10/2003 | Bargh et al. | 707/100 |
| 2003/0197702 A1 * | 10/2003 | Turner et al. | 345/473 |
| 2004/0210386 A1 * | 10/2004 | Wood et al. | 701/208 |
| 2005/0171746 A1 * | 8/2005 | Thalhammer-Reyero | 703/2 |
| 2006/0262121 A1 * | 11/2006 | Grassia et al. | 345/473 |

OTHER PUBLICATIONS

C. Geiger, V. Paelke, C. Reimann, W. Rosenbach. "A Framework for the Structured Design of VR/AR Content." VRST 2000, Seoul, Korea, pp. 75-81.*

Webopedia. Definition of Computer. From Internet Archive, date Aug. 6, 2002.*

Microsoft Windows XP. Screenshots. 2001. pp. 1-3.*

Kamat et al. Scene Graph and Frame Update Algorithms for Smooth and Scalable 3D Visualization of Simulated Construction Operations. Computer-Aided Civil and Infrastructure Engineering. vol. 17. No. 4. Jul. 2002.*

* cited by examiner

| NODE ID | NODE LABEL | PARENT OF | CHILD OF |
|---|---|---|---|
| 1 | SCENE RENDERER | 2; 3 | - |
| 2 | TARGET SCENE | 4; 5 | 1 |
| 3 | CAMERA 1 | - | 1 |
| 4 | SET | 8; 9 | 2 |
| 5 | CUBE 1 | 6; 7; 10; 11; 12; 13; 14; 15 | 2 |
| 6 | SPHERE 1 | 11; 16 | 5 |
| 7 | SPHERE 2 | 14; 17 | 5 |
| 8 | LIGHT 1 | - | 4 |
| 9 | TEXTURE - BLACK 009 | - | 4 |
| 10 | ANIMATION - SPIN 5 | - | 5 |
| 11 | TEXTURE - WHITEHOUSE | - | 5; 6 |
| 12 | TEXTURE - BATTLESHIP | - | 5 |
| 13 | TEXTURE - SPACESHUTTLE | - | 5 |
| 14 | TEXTURE - ASTRONAUT | - | 5; 7 |
| 15 | TEXTURE - PALACE | - | 5 |
| 16 | ANIMATION - ORBIT H | - | 6 |
| 17 | ANIMATION - ORBIT A | - | 7 |

*Figure 6*

ANIMATION EDITING APPARATUS

BACKGROUND OF THE INVENTION

1. Field of the Invention

The present invention relates to animation editing apparatus for editing animation data, and a method of editing animation data in a data processing system.

2. Description of the Related Art

Computerised systems for the editing of animation data have been used for some time. In order to provide a human editor access to the required editable parameters of an animation, it is known for such systems to display a hierarchical representation of items defining a whole scene. The problem with this approach, is that for a complex, high resolution scene, the editor may be confronted with a hierarchy containing thousands of items representing hundreds of simulated objects and their associated attributes.

BRIEF SUMMARY OF THE INVENTION

According to a first aspect of the present invention there is provided animation editing apparatus for editing animation data, said apparatus comprising data storage means, processing means, visual display means and manually responsive input device configured to allow a user to indicate a selected point on the visual display means, wherein: said visual display means is configured to display an image representing a simulated three-dimensional world-space including a plurality of simulated objects; said manually responsive input device is configured to provide an input signal indicating a location within said image corresponding to one of said simulated objects; said processing device is configured to identify the selected simulated object in response to receiving said input signal, and to retrieve data from said data storage means of one or more related items related to said selected simulated object within a defined degree of relationship; and said visual display means is configured to display labels identifying the selected simulated object and said related items only.

BRIEF DESCRIPTION OF THE SEVERAL VIEWS OF THE DRAWINGS

FIG. 6 shows a table representing a database containing hierarchy data 510;

BEST MODE FOR CARRYING OUT THE INVENTION

FIG. 1

Figure 1:
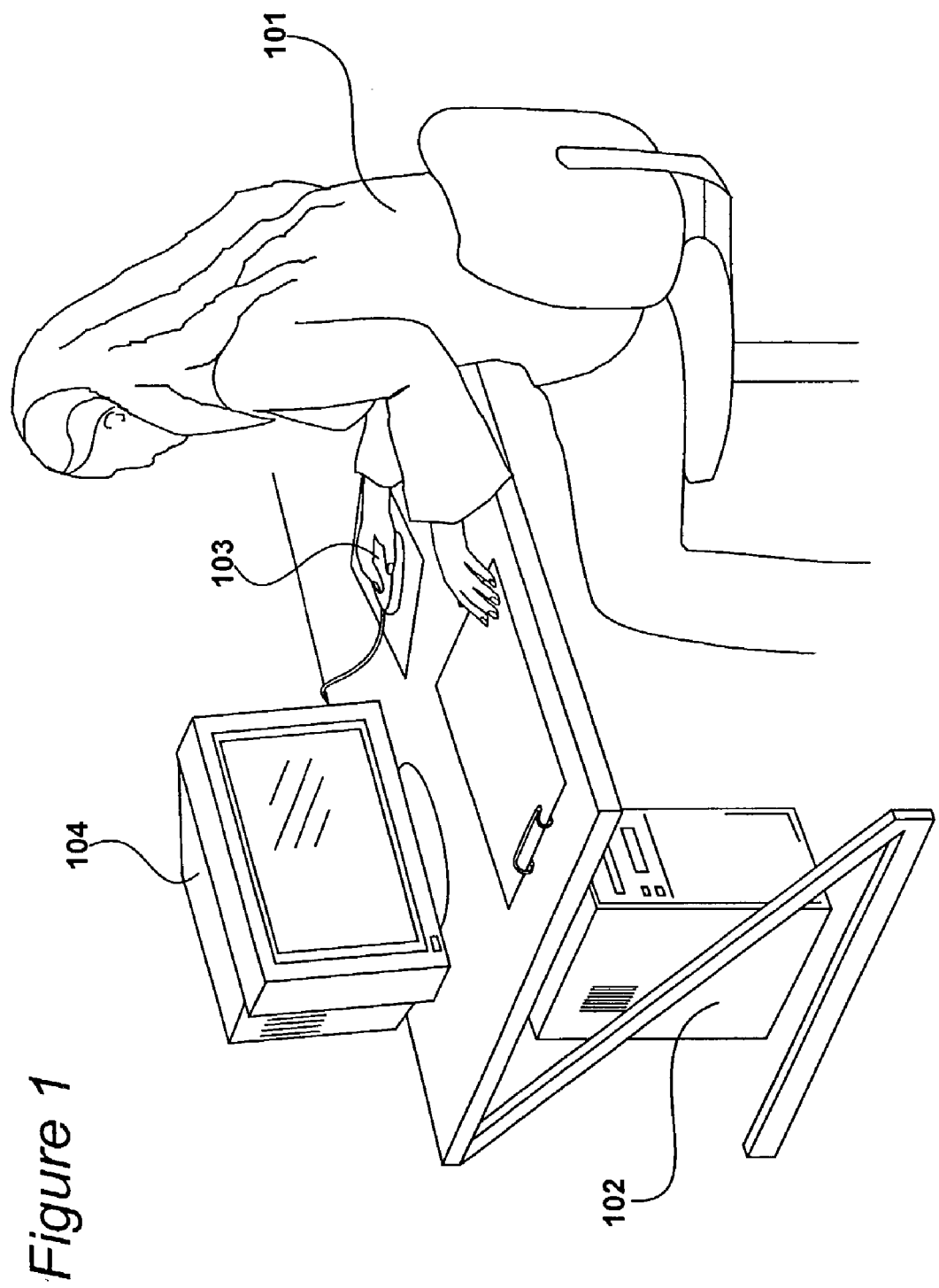
FIG. 1 shows an animation artist 101 equipped with a computer system 102 for editing animated graphics.

An animation artist 101 equipped with a computer system 102 for editing animated graphics is shown in FIG. 1. The artist 101 inputs signals to the computer system 102 by manual operation of a mouse 103, while viewing a graphical user interface on a visual display unit 104. In response to receiving the input signals from the mouse 103, the system 102 performs functions including: editing animation data; presenting selected editing tools on the user interface; and presenting representations of selected items to be edited.

As an alternative to using a mouse 103, the artist 101 could be provided with a stylus/touch-tablet combination, or a trackball or similar manually responsive input device.

FIG. 2

Figure 2:
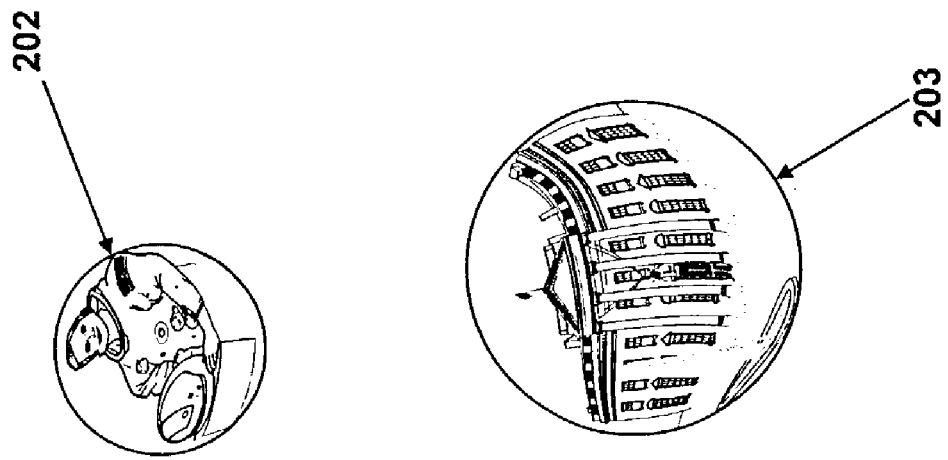
FIG. 2 shows an example of an animation to be edited by the user 101.
Figure 2:
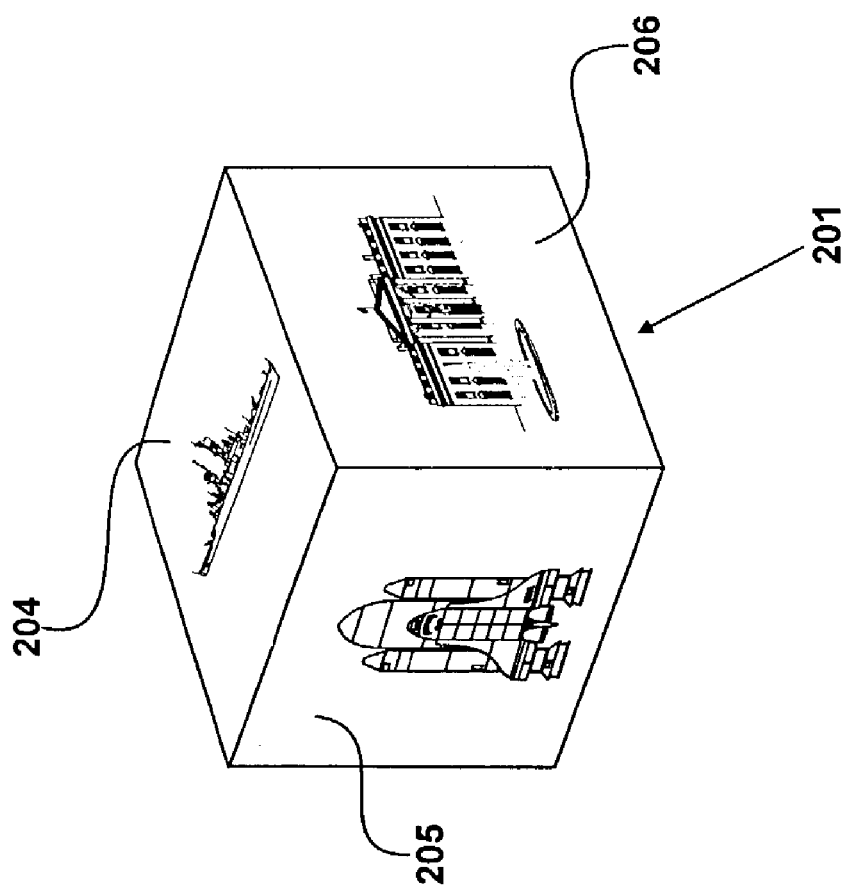

An example of an animation to be edited by the user 101 is shown in FIG. 2. The animation comprises three simulated three dimensional objects 201, 202 and 203 within a simulated three dimensional world-space. The first of the simulated objects is a cube 201 which is animated such that it rotates about a vertical axis passing through its upper face 204, while apparently making movements towards the viewer. Consequently, during the animation, five of its six faces may be viewed. A bit map image has been texture mapped onto each of the five viewable faces, and thus, for example face 204 appears to comprise a two dimensional image of a battleship, while faces 205 and 206 comprise images of a spaceshuttle and the Whitehouse respectively. The two remaining simulated objects 202 and 203 are spheres which are animated such that they appear to rotate about the cube 201, in a similar manner to satellites orbiting a planet. The spheres have also had bit map images mapped onto their surfaces, so that sphere 203 supports the same image as cube face 206, while sphere 202 supports the same image as one of the other cube faces presently not viewable.

FIG. 3

Figure 3:
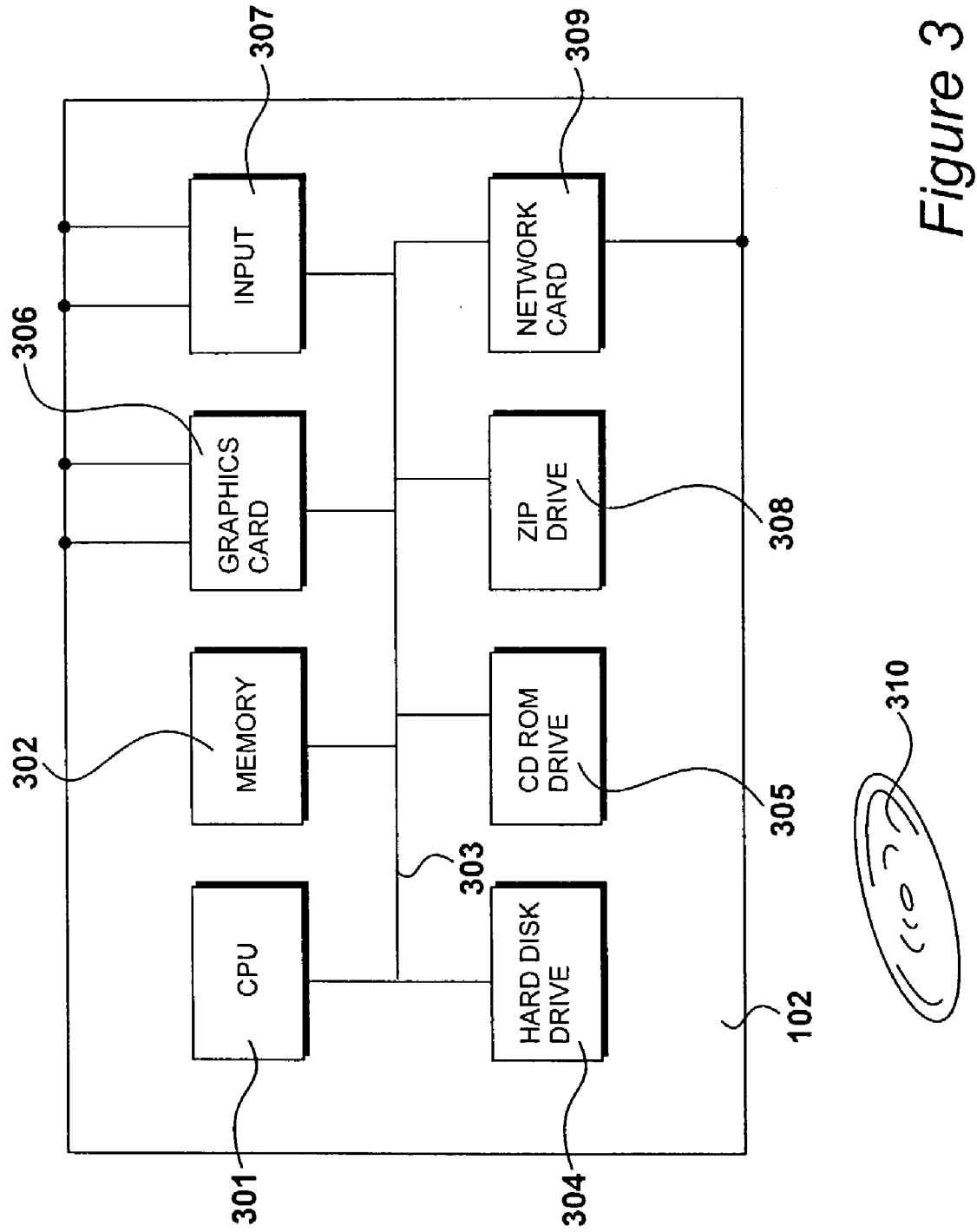
FIG. 3 shows details of computer system 102.

Computer system 102 is detailed in FIG. 3. It includes a central processing unit 301 such as an Intel Pentium 4 processor or similar. Central processing unit 301 receives instructions from memory 302 via a system bus 303. On power-up, instructions are read to memory 302 from a hard disk drive 304. Programs are loaded to the hard disk drive 304 by means of a CD-ROM received within a CD ROM drive 305. Output signals to the display unit are supplied via a graphics card 306 and input signals from the mouse 103, similar devices and a keyboard are received via input card 307. The system also includes a zip drive 308 and a network card 309, each configured to facilitate the transfer of data into and out of the system.

The present invention is embodied by an animation editing program installed from a CD ROM 310 via the CD-ROM drive 305.

FIG. 4

Figure 4:
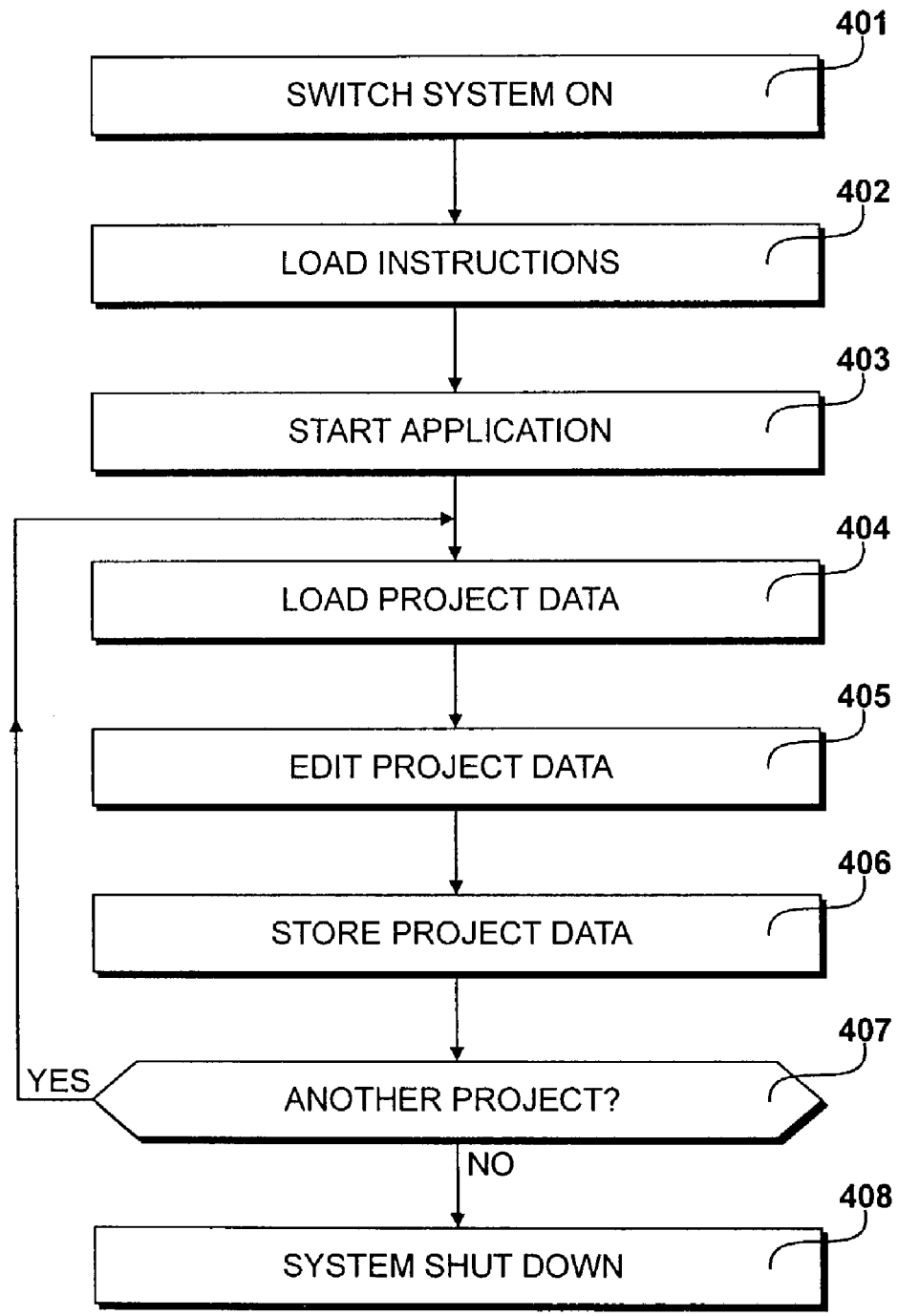
FIG. 4 shows a flow chart outlining the operation of the system 102.

A flow chart outlining the operation of the system 102 is shown in FIG. 4. Following the system 102 being switched on at step 401, instructions are loaded from the hard disk drive 304 into main memory 302, at step 402. Upon completion of the loading operation at step 402, the application starts at step 403, and a graphical user interface for editing animation projects is initialised. At step 404, existing project data is loaded into memory such that it may be edited at step 405. The updated project data is then stored at step 406. At step 407 it is determined whether or not a further project is to be edited, and if so, steps 404 to 407 are repeated. Otherwise, the system is shut down at step 408.

Figure 5A:
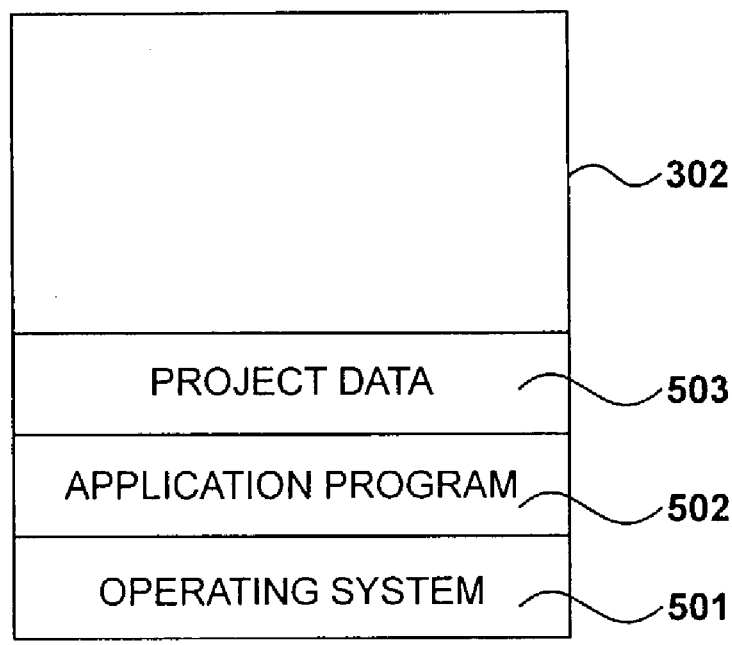
FIGS. 5A and 5B show data contained within main memory 302 following step 404 of FIG. 4.
Figure 5B:
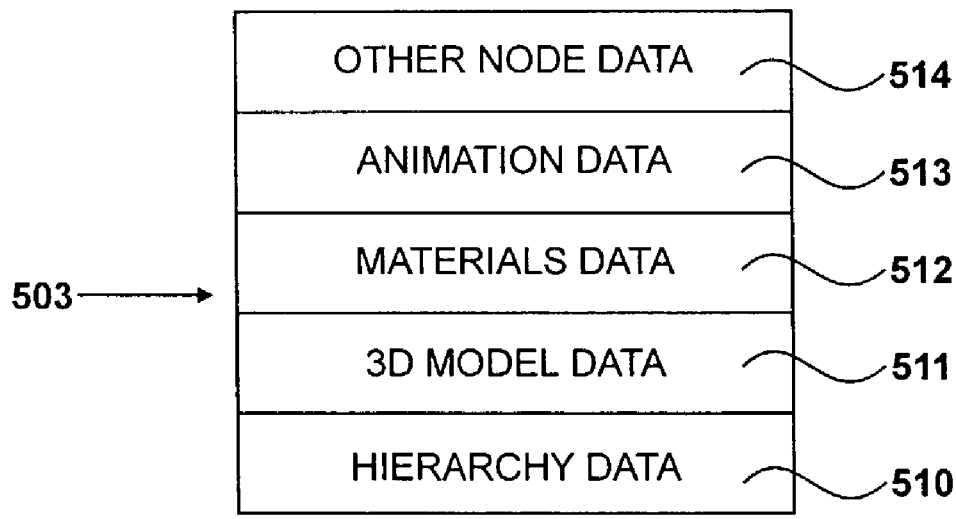

FIGS. 5A and 5B

Data contained within main memory 302 following step 404 is shown in FIG. 5A. Thus following the loading steps 402 and 404, the memory 302 contains an operating system 501, which may be for example Windows or Linux, the application program 502 by which animated graphics may be edited as described below, and project data 503 defining the particular animation being edited.

The project data 503 is illustrated in greater detail in FIG. 5B. The project data comprises: hierarchy data 510; three-dimensional model data 511; materials data 512; animation data 513 and other node data 514. The three-dimensional model data 511 defines the geometry of simulated objects appearing in the graphic. Thus, for example, during editing of the animation of FIG. 2, the model data 511 comprises data defining the shape and dimensions of objects 201, 202 and 203. Materials data 512 comprises data defining colours, textures or patterns appearing in the animation, such as the Whitehouse, battleship, spaceshuttle, and Astronaut textures used in the animation of FIG. 2. The animation data 513 defines the simulated three-dimensional movement of the simulated objects appearing in the animation. Thus, for example, animation data 513 may define the manner in which the cube 201 rotates and the manner in which the spheres 202 and 203 orbit the cube. Other node data 514 defines other characteristics of the animation, such as: the set in which the simulated objects appear; the lights; the cameras; etc.

The hierarchy data 510, defines relationships existing between items defined by data 511, 512, 513 and 514. Thus, the hierarchy data 510, defines relationships between simulated objects defined by data 511, material items defined by data 512, animations defined by data 513, and lights, cameras etc. defined by data 514.

FIG. 6

The hierarchy data may be stored within the memory of the system 102 as a database. A table representing a database containing hierarchy data 510 is shown in FIG. 6. Each item defining an animation is provided with a node label, suitable for identifying the item to a user such as artist 101, and a node identity.

The example provided in FIG. 6 corresponds to the animation of FIG. 2. Thus, there are three items given the node labels "CUBE1", "SPHERE1" and "SPHERE2" defining the simulated cube 201 and spheres 202 and 203. There are also five items, with node identities 11, 12, 13, 14 and 15, defining textures, and three items with node identity 10, 16 and 17 defining the animation of the three simulated objects. One light and one camera have been defined for the present animation and these are identified by node identities 8 and 3.

Two other items labelled "target scene" and "scene renderer" are also included in the database. The "target scene" defines the overall composition of the animation. The "scene renderer" is a process for rendering the three dimensional animation, defined by the target scene, into a two dimensional animated image that is suitable for display.

It should be understood that an item may be a data-set, or a process which defines a part of an animation, such as a simulated object, an attribute of an object, the overall composition of the animation or the rendering of the animation.

The relationships existing between the items of the database are illustrated by the third column, "PARENT OF" and fourth column "CHILD OF" of the table. The two relationships are the opposite of each other, and thus, if item "A" is a parent of item "B", then item "B" is a child of item "A". For example, the sixth line shows that "SPHERE1" is the parent of "Texture-Whitehouse" (node identity 11) and "Animation-Orbit H" (node identity 16), while line 11 shows that "Texture-Whitehouse" is a child of "SPHERE1" (node ID 6) and line 16 shows that "Animation-Orbit H" is a child of "SPHERE1" (node ID 6). Thus the attributes of objects are children of the object.

The two spheres, "SHERE1" and "SHERE2" have been constrained to the object "CUBE1" such that they follow the movement of "CUBE1" during the animation. An offset constraint is used so that the spheres are held apart from "CUBE1". Because the spheres are constrained to "CUBE1", they are its children, as indicated in FIG. 6.

The database therefore contains data indicating which items are directly related and the nature of the relationship, that is, "parent of" or "child of". The database is therefore designed such that given the node identity of an item, the node identities of its children may be looked up in the third column, or its parent may be looked up in the fourth column.

FIG. 7

Figure 7:
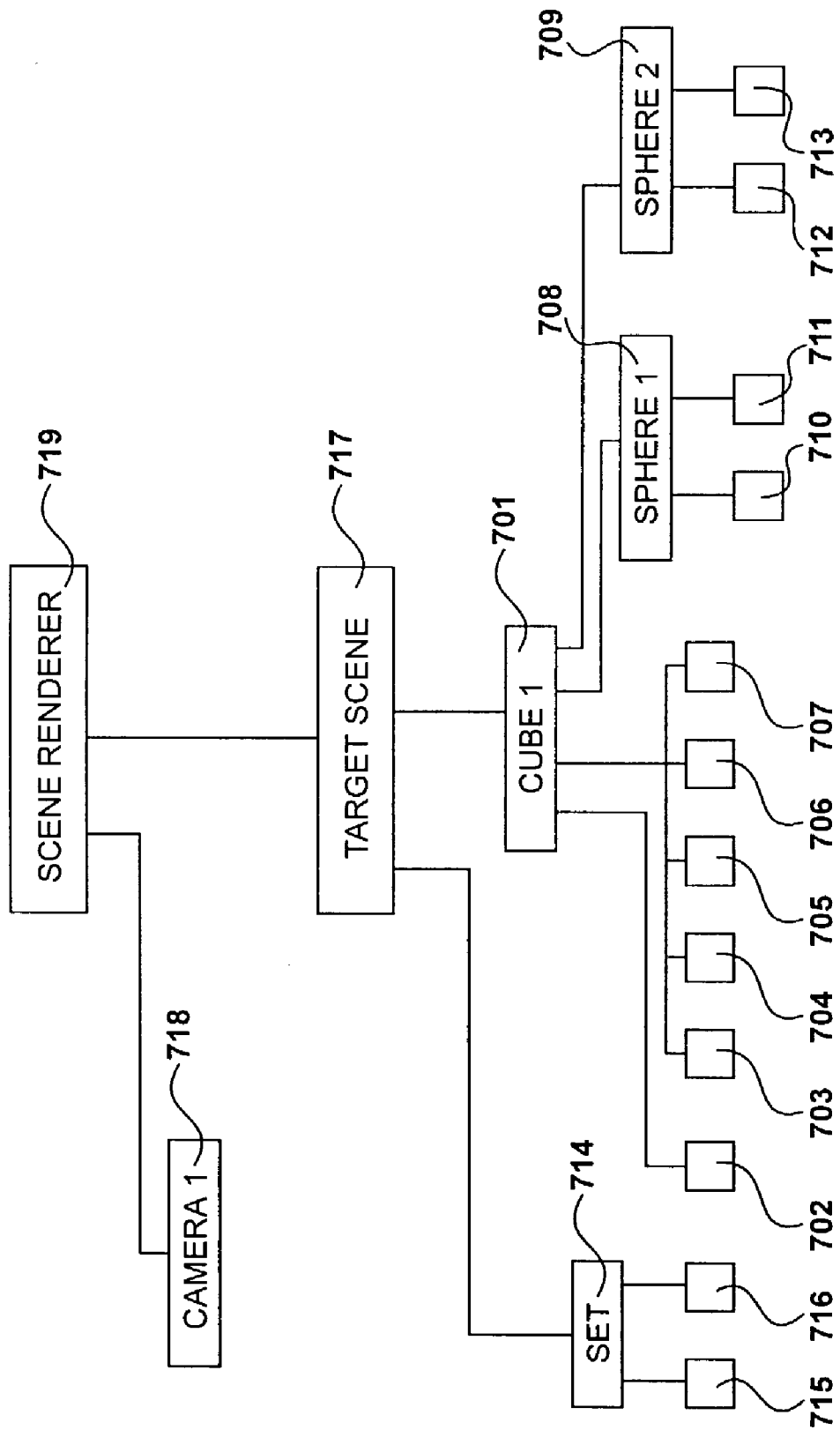
FIG. 7 shows a scene tree according to the prior art.

A scene tree according to the prior art is shown in FIG. 7. Scene trees provide a graphical representation of the hierarchical structure of items defining an animation. Conventional editing systems provide such a scene tree to allow an artist such as artist 101 to identify and edit parameters of an animation.

The scene tree of FIG. 7 illustrates the animations items and relationships shown in the table of FIG. 6. Thus, cube 201 is represented by an node 701 which has lead-lines down to nodes 702, 703, 704, 705, 706, 707, 708 and 709 representing respectively the animation and the five textures applied to the cube 201, and the spheres 202 and 203. Similarly, spheres 202 and 203, represented by nodes 708 and 709, have associated attributes represented by nodes 710 and 711, and 712 and 713 respectively. A node 714 is used to represent the set and this has lead-lines down to nodes 715 and 716 representing the texture applied to the set and the light applied to the set.

Lead-lines drawn up from the set 714 and cube 701 to another node 717, representing the target scene, indicate that the target scene is the parent of said set, and cube. Lead-lines from the node 717 and a node 718 representing a defined camera, "CAMERA1", up to scene renderer node 719 show that the scene renderer is the parent of said camera and the target scene.

The graphical animation illustrated in FIG. 2 is simple, being composed of just three simple objects, and yet the corresponding scene tree, shown in FIG. 7, has nineteen nodes. In animations which are more complex, for example containing many human characters or animals, scene trees have been known to contain hundreds and in some cases thousands of nodes. It will therefore be understood that a user such as artist 101, will have difficulties in navigating around the scene tree in such cases.

In contrast, as described below, the system 102 provides a user interface which allows its user to navigate around the objects of a scene and related attributes in such a way that only items closely related to a user selected item are displayed. The user is therefore presented with only information which is relevant to their present interest, and only of a limited volume, thus making it relatively easy to comprehend when compared to the scene tree of FIG. 7.

Furthermore, the animation editing system 102 preferably includes character registration mapping as described in the applicants co-pending Canadian patent application published as CA 2 314 712. It has been found that the character registration mapping in combination with the features of the graphical user interface described herein allows a user to perform animation editing without the need to refer to a scene tree, such as that shown in FIG. 7.

Another point to note from FIG. 7 is that although the textures applied to the spheres 202 and 203 are the same as two of the textures applied to the cube 201, there is no indication of this in the scene tree. This can be a problem in more complex animations where, for example, attributes such as colours and textures are applied to several objects but, due to the complexity of the scene, it is not apparent to the artist. For example, an artist may edit the parameters of an attribute applied to an object, not realising that they are also editing an attribute of other objects.

FIG. 8

Figure 8:
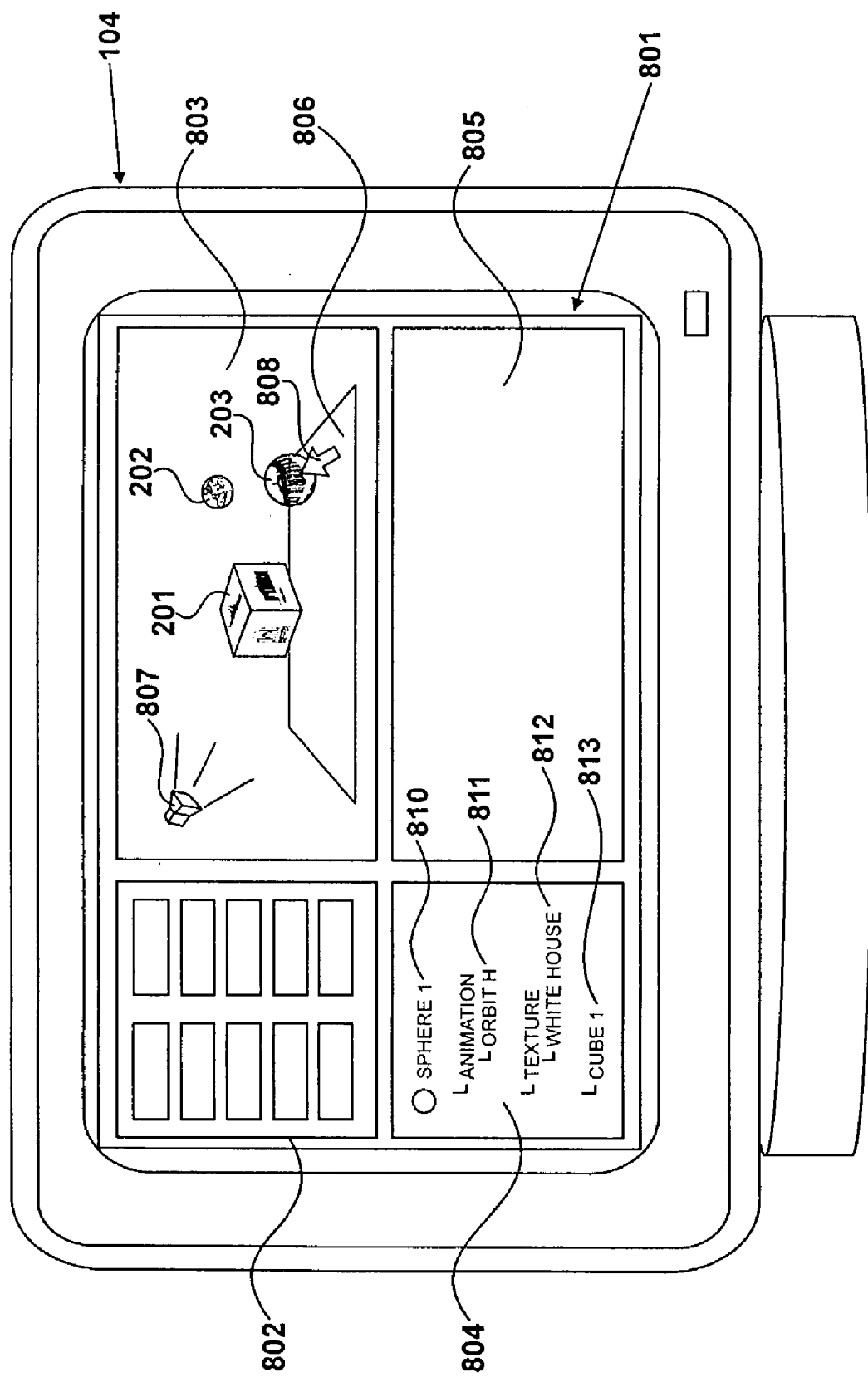
FIG. 8 shows a graphical user interface (GUI) 801 produced by the application program and displayed on the visual display unit 104.

A graphical user interface (GUI) 801 produced by the application program and the GUI is displayed on the visual display unit 104 shown in FIG. 8. The user interface 801 includes four windows: an icon window 802, a viewer window 803, a navigation window 804 and a tool window 805. The viewer window 803 contains a two dimensional representation of the three-dimensional animation which is to be edited. Thus, in the present example, the viewer window 803 contains a virtual floor 806, upon which the cube 201, and the two spheres 202 and 203 are arranged. In addition, the viewer window 803 also contains a virtual directional light which appears to illuminate the objects 201, 202 and 203. The viewer window 803 also presently contains the cursor 808 which may be moved across the whole display by means of the mouse 103.

The icon window 802 contains a number of icons which facilitate the creation of new simulated objects, the addition of materials to objects within the scene, the animation of objects within the scene, etc.

The navigation window 804 displays a number of labels representing selected items defining the animation. The particular items displayed by the navigation window are selected by the application program in response to the user's input. Specifically, when the system receives an input indicating that a simulated object in viewer window 803 has been selected by the user, the system displays a label representing said selected object at the top of the navigation window 804, and then displays labels representing other items which are directly related to the selected simulated object.

"Directly related" is herein defined as meaning "being a parent of, or being a child of". Thus if two items are directly related, then one is a child of the other, and when a simulated object is selected by the user, labels representing said object, the child or children of said object and the parent of said object are displayed in the navigation window.

For example, in FIG. 8, the user 101 has double clicked the mouse with the cursor 808 over the sphere 203 in window 803, in order to indicate to the system that the sphere 203 is to be represented in the navigation window 804. Therefore, a label 810 representing sphere 203, labels 811 and 812 representing its attributes and another label 813 representing its parent, "CUBE1", are displayed in window 804.

The user 101 is therefore presented with only the portion of the hierarchical structure that they are interested in, rather than being confronted with the whole scene tree.

The application selects suitable tools for editing the selected item and displays said tools within window 805.

After selecting a particular simulated object the user may then selected another such object by clicking on the relevant object in viewer window 803. Alternatively, the user may navigate around the hierarchy structure by clicking on labels displayed in the navigation window 804. For example, the user could view the items directly related to the cube 201 by clicking on the label "CUBE1" 813, or if they wished to edit the texture applied to the sphere 203 they could click on the label 812.

The application program is therefore structured such that if the system receives an input indicating that a label within the navigation window has been selected, it displays the selected label at the top of the navigation window and displays labels of directly related items below it. An example of this functionality is provided by FIG. 9.

FIG. 9

Figure 9:
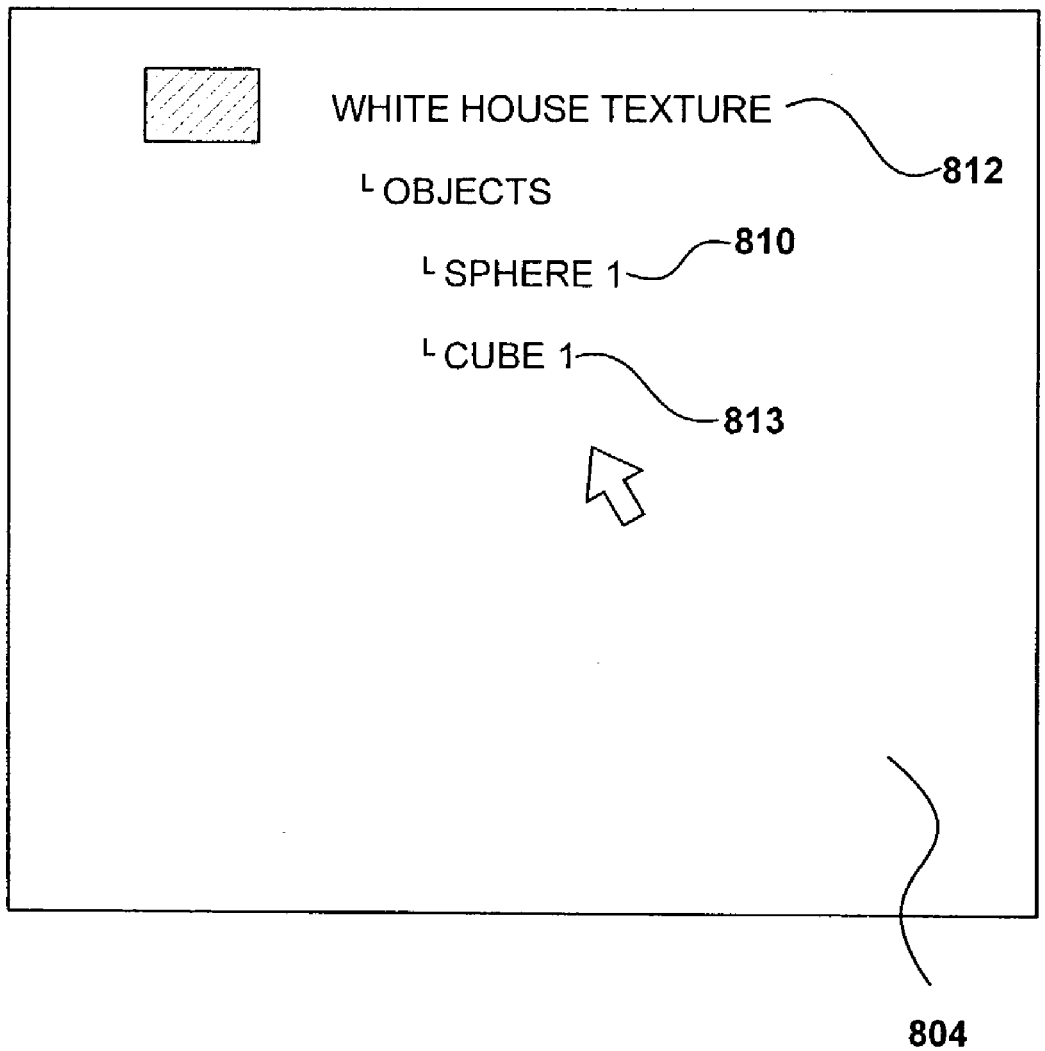
FIG. 9 shows the navigation window 804 after user selection of the label for the Whitehouse texture.

FIG. 9 illustrates the navigation window 804 after a user selection of the label for the Whitehouse texture. By clicking on the Whitehouse texture label 812 in FIG. 8, the user indicates to the system that the Whitehouse texture is to be selected. Thus as shown in FIG. 9, the Whitehouse label 812 is repositioned at the top of the navigation window 804 to identify the Whitehouse label 812 as the selected item, and labels representing items directly related to said texture are displayed below it. Therefore, window 804 displays labels 810 and 813 representing the simulated objects sphere 203 and cube 201, making it clear to the user that the Whitehouse texture is used on both the sphere 203 and the cube 201.

The windows 802 and 803 remain unchanged in appearance, and so continue to display creation tool icons and a view of the animation. While window 805 is updated to display appropriate editing tools If the user now wishes to divert their attention to the cube 201, they may update the navigation window by selecting the relevant label 813 using the mouse.

FIG. 10

Figure 10:
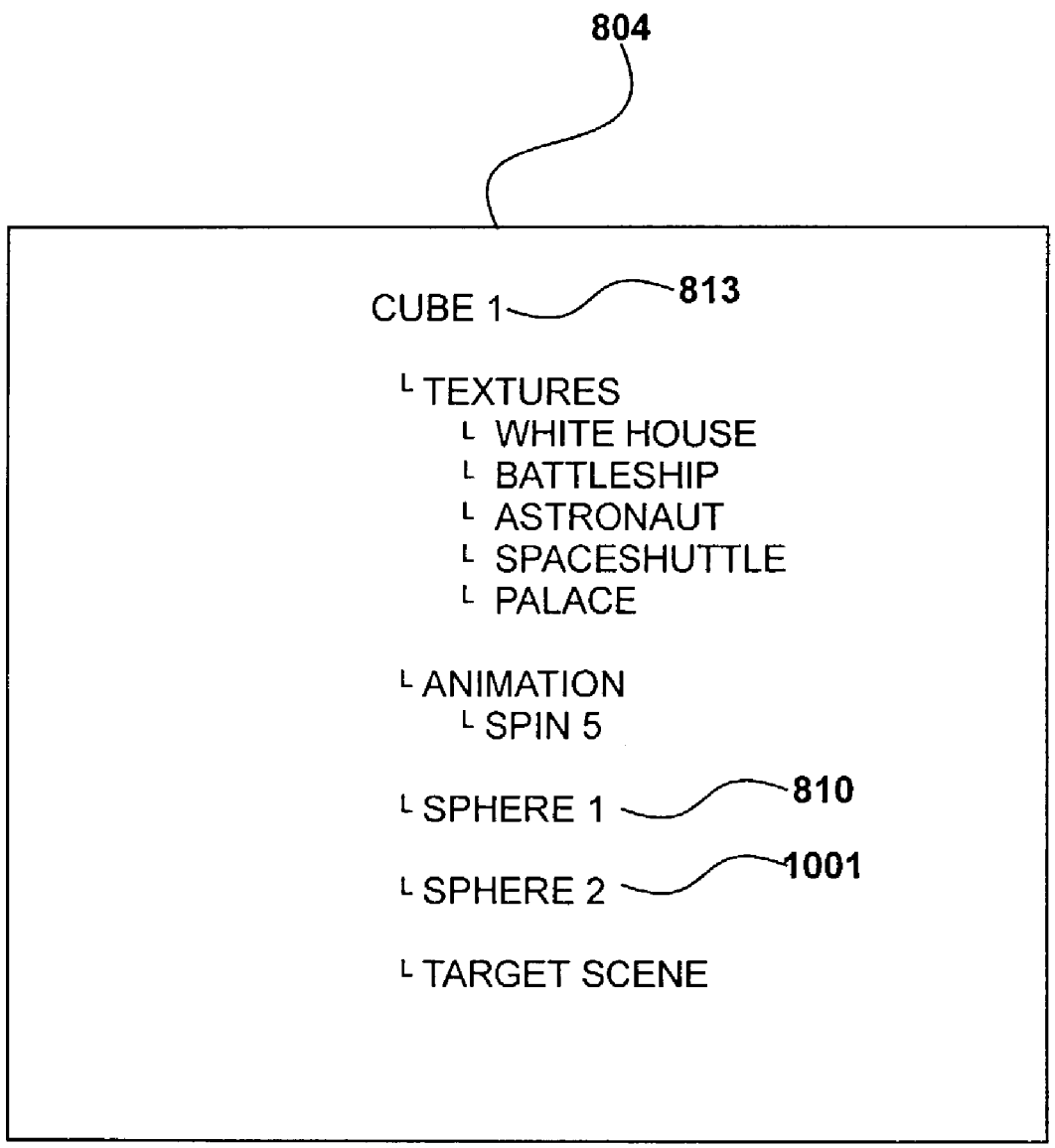
FIG. 10 shows the navigation window 804 after selection of the "CUBE1" label 813.

FIG. 10 shows the navigation window 804 after selection of the "CUBE1" label 813. Once again the selected item has been positioned at the top of the window 804 and labels of the directly related items are displayed below it. Thus, for example, window 804 displays labels representing the attributes of the selected object, i.e. the cube 201, and labels 1001 and 810 representing the objects 202 and 203 constrained to said selected object.

FIG. 11

The processing of data in response to user generated input commands at step 405 of FIG. 4 allows many sophisticated animation techniques to be performed. A portion of the procedures performed, implementing the preferred embodiment of the present invention are illustrated by FIGS. 11 to 14. The processes are event driven and will respond to event input data generated by the user. In order to respond to an event the central processing unit 301 responding to interrupts and the animation program, in combination with the operating system, is required.

Figure 11:
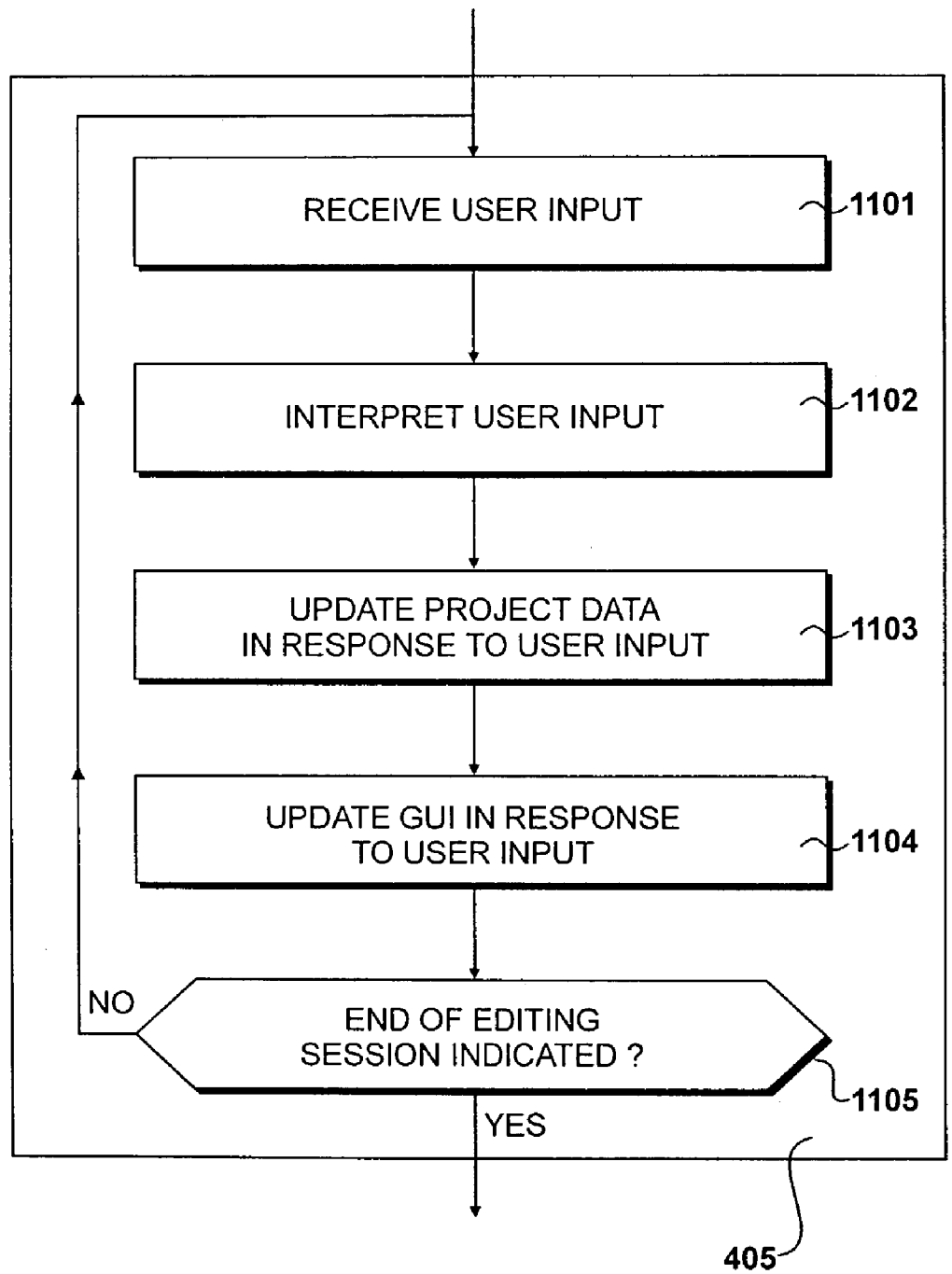
FIG. 11 shows the step 405 of editing project data in greater detail.

FIG. 11 shows greater detail of the step 405 of editing project data. Within step 405, at step 1101, the system receives an input signal generated by a mouse button click. At step 1102, the input signal is interpreted. The input signal provides information relating to the two dimensional co-ordinates of the mouse cursor, and these co-ordinates are used in combination with a look-up table to determine what the co-ordinates correspond to. If the co-ordinates fall within the viewer window 803, it is then determined whether they correspond to a position on the image of a simulated object, and if so, the node identity for the simulated object is identified. If the co-ordinates fall within the navigation window 804, it is then determined whether a displayed label has been selected, and if so the node identity corresponding to the node label is identified.

Alternatively, if the user input corresponds to the operation of an editing tool or creation tool, project data will be updated at step 1103. At step 1104, the graphical user interface is updated in response to the user input. Then at step 1105, a question is asked to determine whether the end of the editing session has been indicated by the user input, and if so step 405 is completed. Otherwise steps 1101 to 1105 are repeated.

FIG. 12

Figure 12:
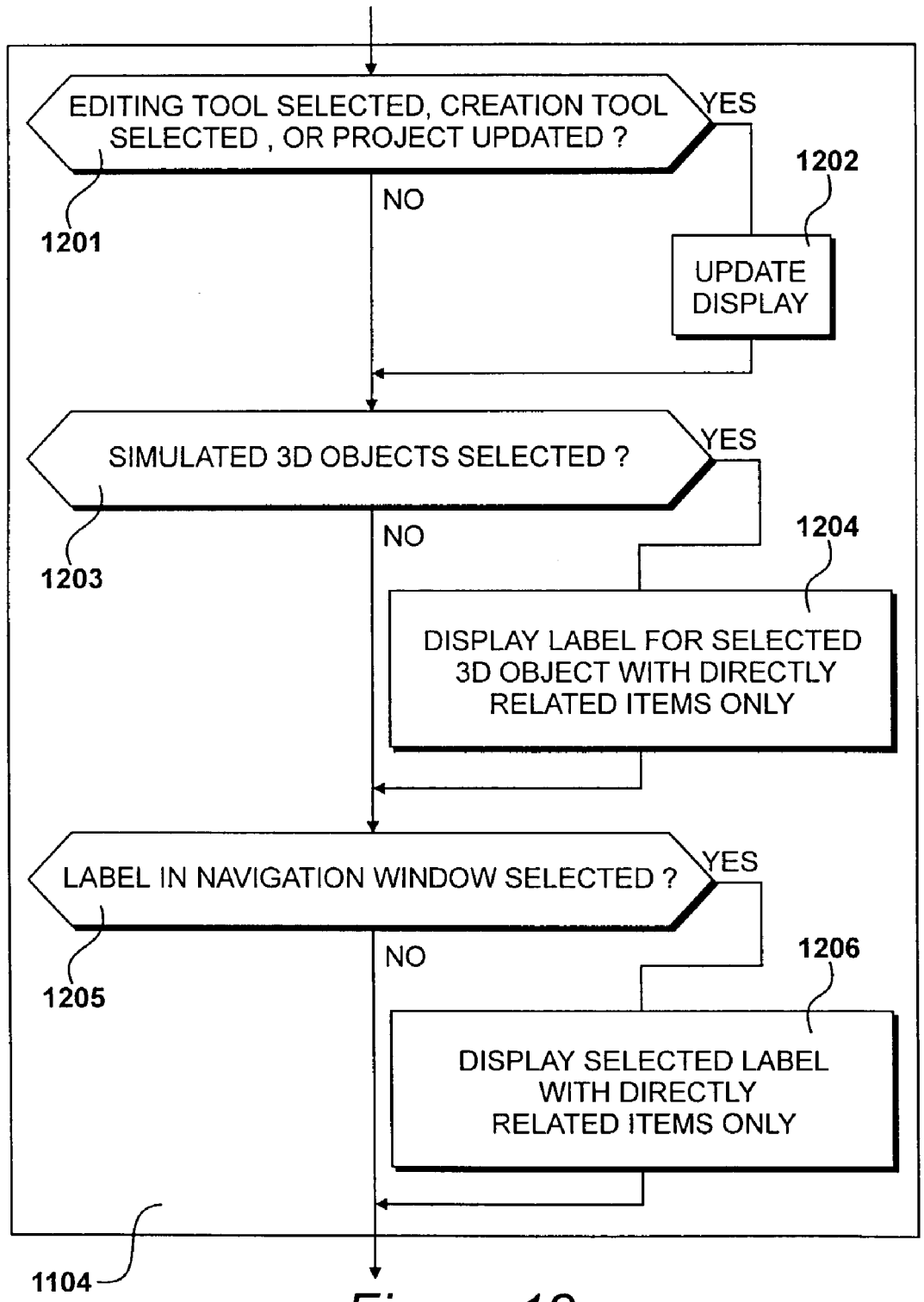
FIG. 12 shows more detail of the step 1104 of updating the user interface.

The step 1104 of updating the user interface is shown in more detail in FIG. 12. At step 1201 it is determined whether the user input indicated the selection of an editing tool or creation tool, or if the project was edited at step 1103, and if so, the display is updated accordingly at step 1202 before step 1203 is performed. Otherwise the process enters step 1203 directly.

At step 1203 a question is asked to determine whether the user input indicated the selection of a simulated three dimensional object, and if so, step 1204 is performed before step 1205. Otherwise step 1205 is performed directly after step 1203. At step 1204 node labels are displayed corresponding to the selected simulated object and items directly related to said selected object only. Thus, unlike the prior art illustrated in FIG. 7, only labels of selected items are displayed and not the whole scene tree.

At step 1205 a question is asked to determine whether the received user input indicated the selection of a label in the navigation window 804. If this is so, then the selected label is displayed in the navigation window 804 along with labels of directly related items only. Completion of step 1206, or a negative answer to the question at step 1205 completes step 1104.

FIG. 13

Figure 13:
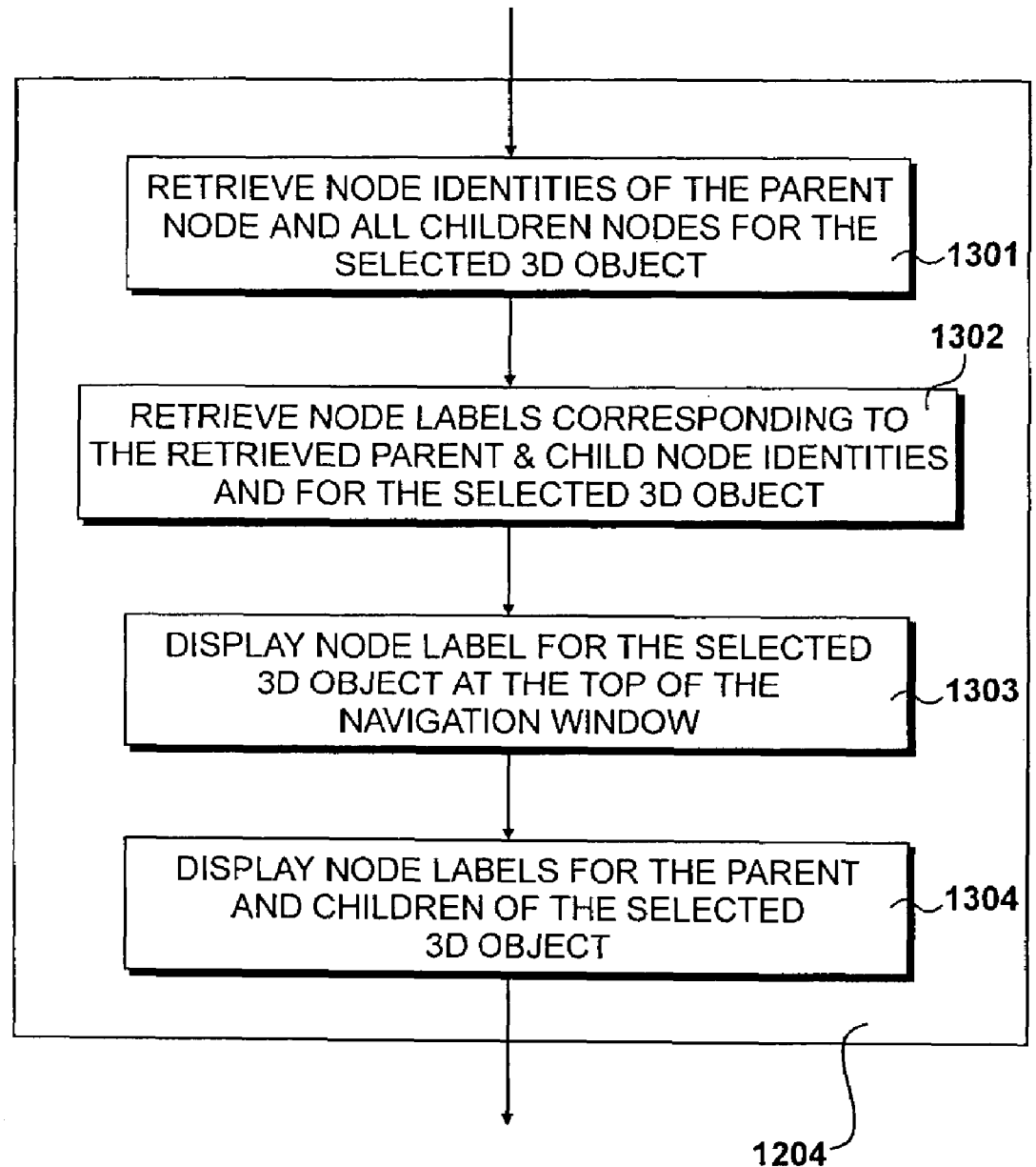
FIG. 13 shows further detail of the step 1204 of displaying labels for selected simulated object and directly related objects.

The step 1204 of displaying labels for a selected simulated object and directly related objects is shown in further detail in FIG. 13. Within step 1204, at step 1301, using the node identity of the selected simulated object and the database illustrated by example in FIG. 6, node identities are retrieved for the parent node and all children nodes for the selected simulated object. Having obtained node identities at step 1301, node labels corresponding to the retrieved parent and child node identities, and for the selected simulated object are retrieved form the database at step 1302. At step 1303 the node label for the selected simulated object is displayed at the top of the navigation window, and the node labels for its parent and children are also displayed in the navigation window during step 1304.

In an alternative embodiment, as well as displaying labels of the parent and children of the selected simulated object, the parent of the parent is also displayed. In a further alternative embodiment, as well as displaying labels of the parent and children of the selected simulated object, the children of the children are also displayed. However, in the preferred embodiment and these two alternative embodiments, the system only displays a label for the selected simulated objects and related items within a defined degree of relationship.

FIG. 14

Figure 14:
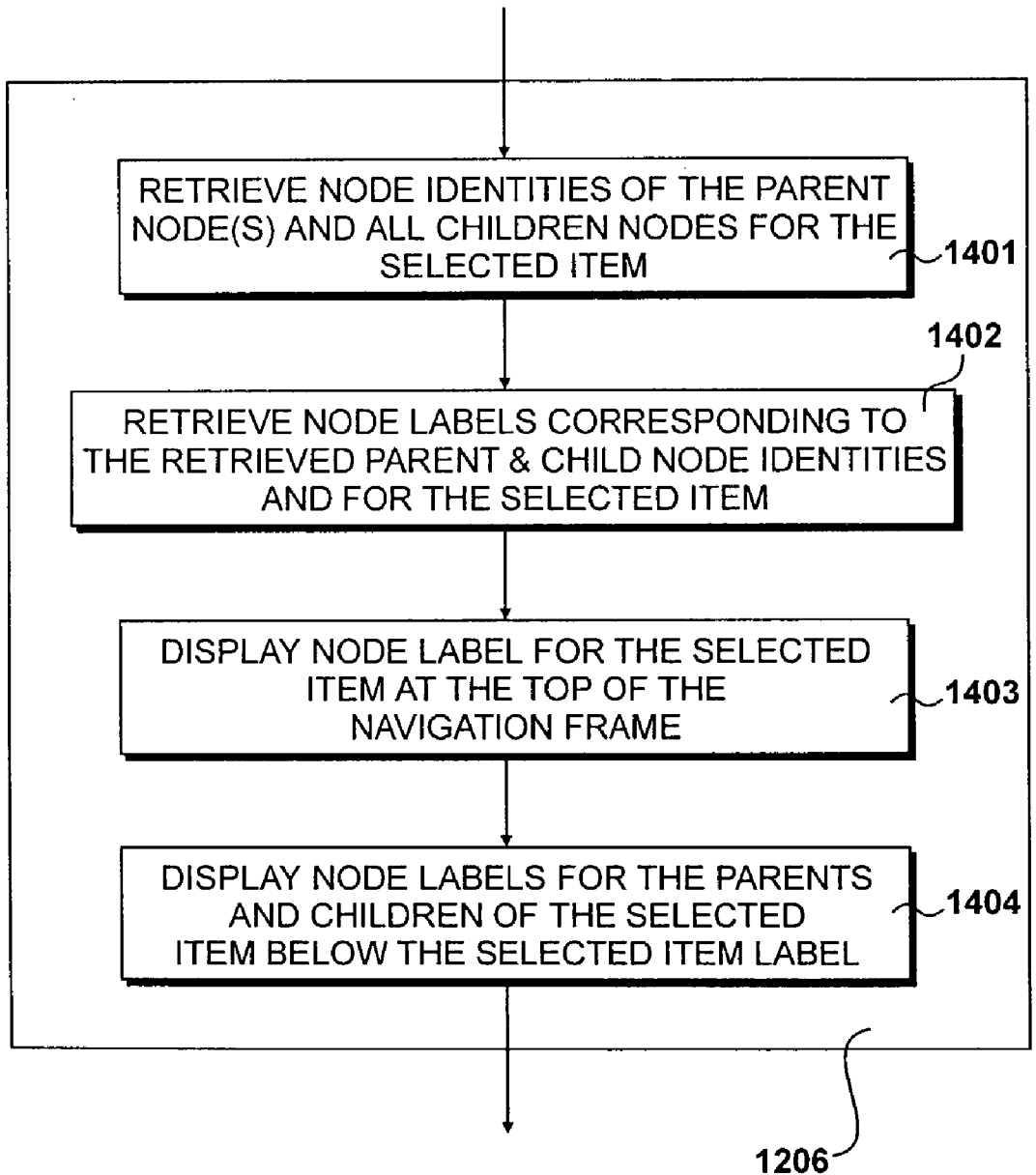
FIG. 14 shows further detail of the step 1206 of displaying a selected label with directly related items.

The step 1206 of displaying a selected label with directly related items is shown in further detail in FIG. 14. At step 1401, node identities are retrieved for the parent nodes and all children nodes for the selected item. This is done using the node identity of the selected item, determined at step 1102, and the database illustrated by example in FIG. 6. It should be noted that where the selected label corresponds to an attribute, there may be more than one parent item. This was the case in the example of FIG. 9, where the "Whitehouse" texture had two parent objects, sphere 302 and cube 201.

Having obtained node identities at step 1401, node labels corresponding to the retrieved parent and child node identities, and for the selected label are retrieved from the database at step 1402. At step 1403 the selected node label is displayed at the top of the navigation window 804, and the node labels for the parents and children are also displayed in the navigation window during step 1404.

FIG. 15

Figure 15:
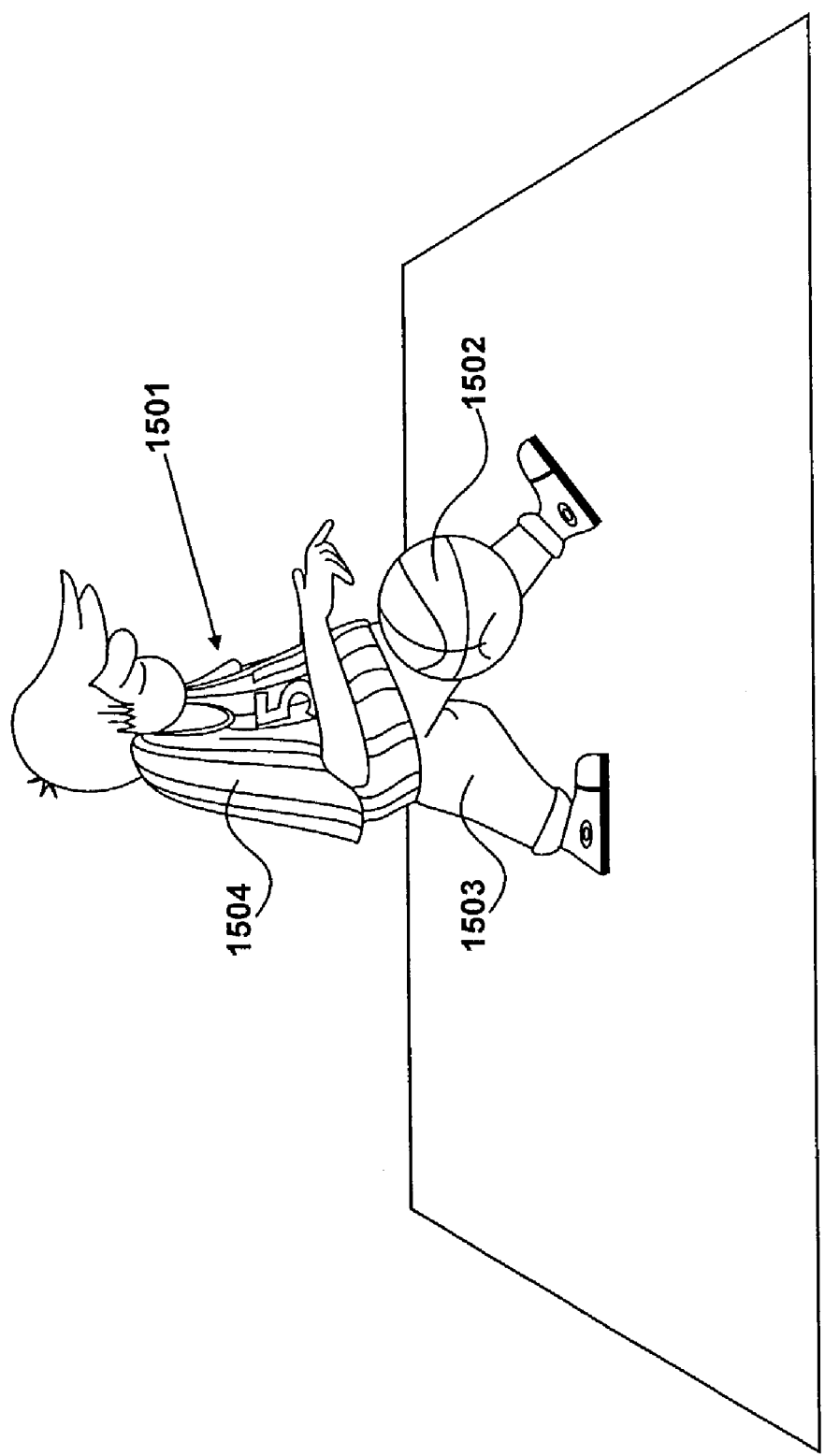
FIG. 15 shows a second example of an animation project to be edited by the user 101.

A second example of an animation project to be edited by the user 101 is illustrated in FIG. 15. The animation comprises a three-dimensional cartoon-like character 1501 who bounces a basketball 1502 as he walks along. The character is wearing baggy trousers 1503 and large basketball shirt 1504 which appear to move naturally as the character moves along.

FIG. 16

Figure 16:
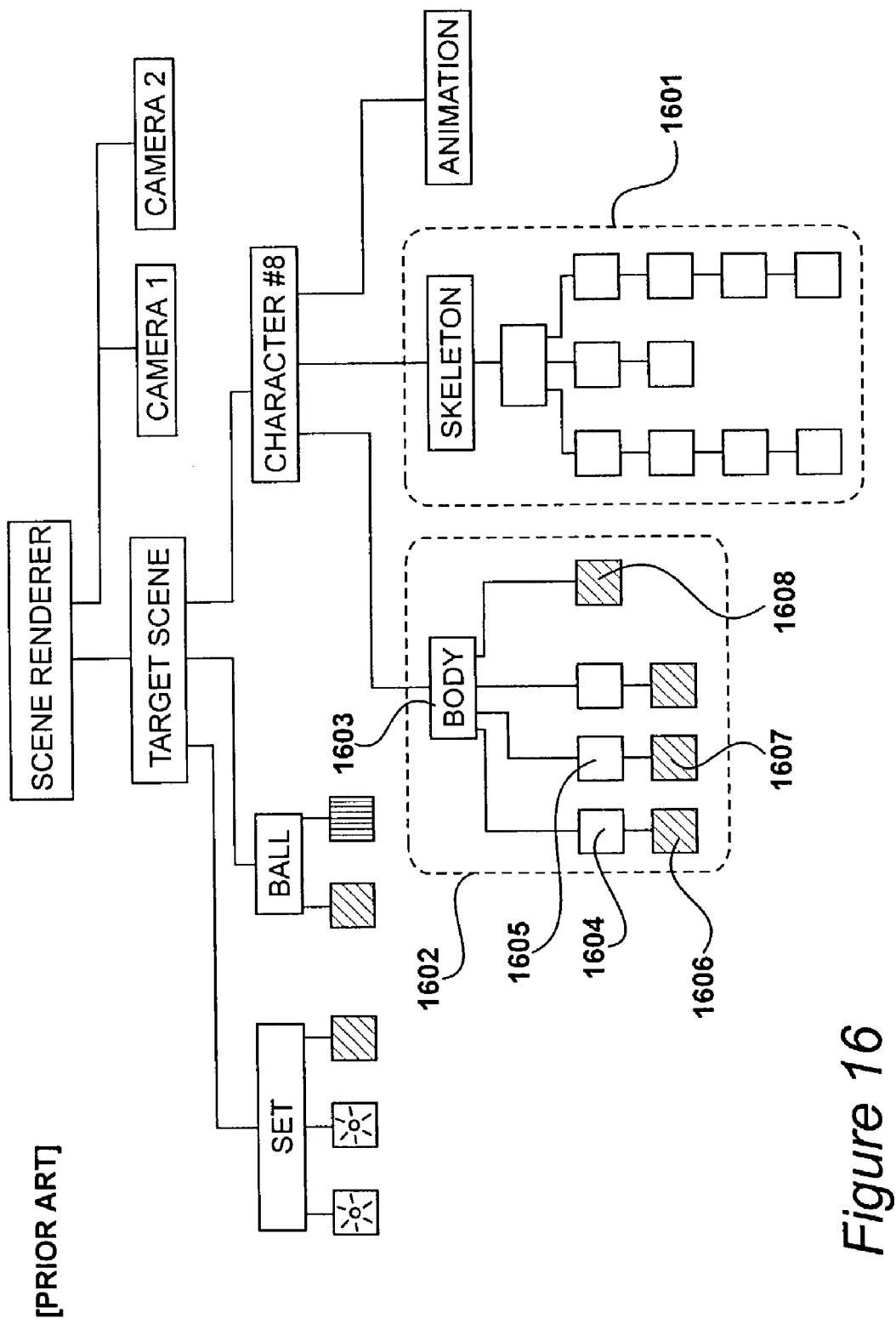
FIG. 16 shows a conventional scene tree representing the animation of FIG. 15.

A conventional scene tree representing the animation of FIG. 15 is shown in FIG. 16. Although still quite a simple animation, it is clearly more complex that that of FIG. 2, and consequently there are thirty-three nodes in the scene tree.

The character comprises a group of simulated objects in the form of an internal skeleton which allows the character to be positioned and animated, and external objects constrained to the skeleton to provide him with a dressed, human-like appearance. Thus the scene tree has a family of nodes, shown within dashed line 1601, which comprise the skeleton of the character, and other nodes, shown within dashed line 1602, which comprise its outer body.

As can be seen in FIG. 16, the skeleton of the character comprises eleven objects referred to as bones. The bones have strict parent-child relationships which determine how the character may be animated using, for instance, forward kinematics, or inverse kinematics.

In this example, the body of the character is formed as a single object and represented by node 1603. The body is the parent of other objects including the shirt 1504 and trousers 1503, represented by nodes 1604 and 1605. The shirt and trousers are constrained to the body, so that their animation is determined by the animation of the body. The shirt and trousers are thus children of the body as illustrated by the scene tree. The shirt, trousers and body each have applied textures as represented by nodes 1606, 1607 and 1608 respectively.

FIG. 17

Figure 17:
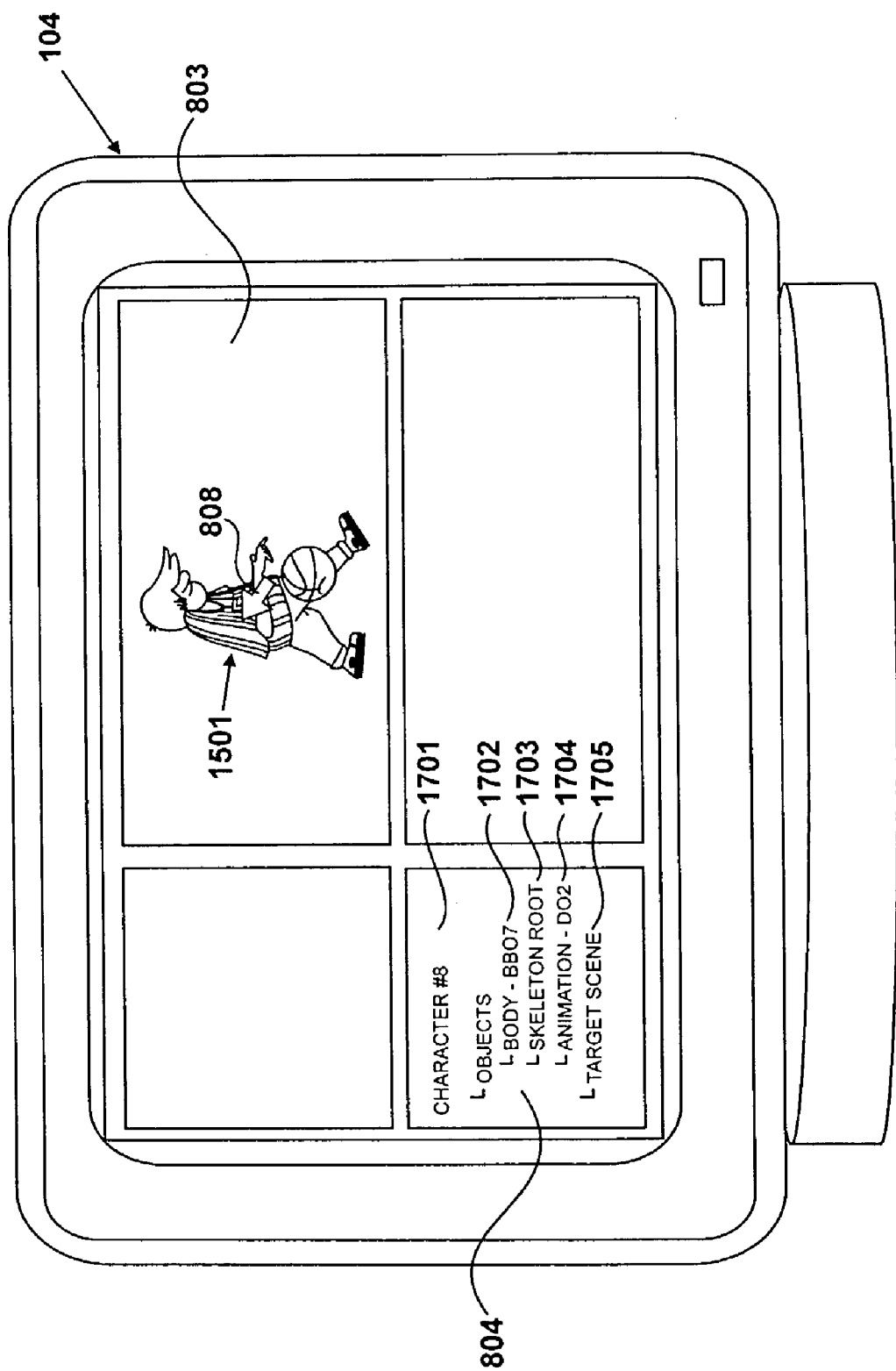
FIG. 17 shows the visual display unit 104 as it appears during editing of the animated character 1501.

The visual display unit 104, as it appears during editing of the animated character 1501, is shown in FIG. 17. The character 1501 is displayed in the viewer window 803 with the mouse cursor 808 positioned over him. The user 101 has double clicked on the character and therefore the node label "CHARACTER#8" 1701 representing the animated character is displayed at the top of the navigation window 804. Listed below the label 1701 are labels 1702, 1703, 1704 and 1705 representing the two simulated objects the character body and the skeleton root, the animation applied to the character, and target scene respectively.

FIG. 18

Figure 18:
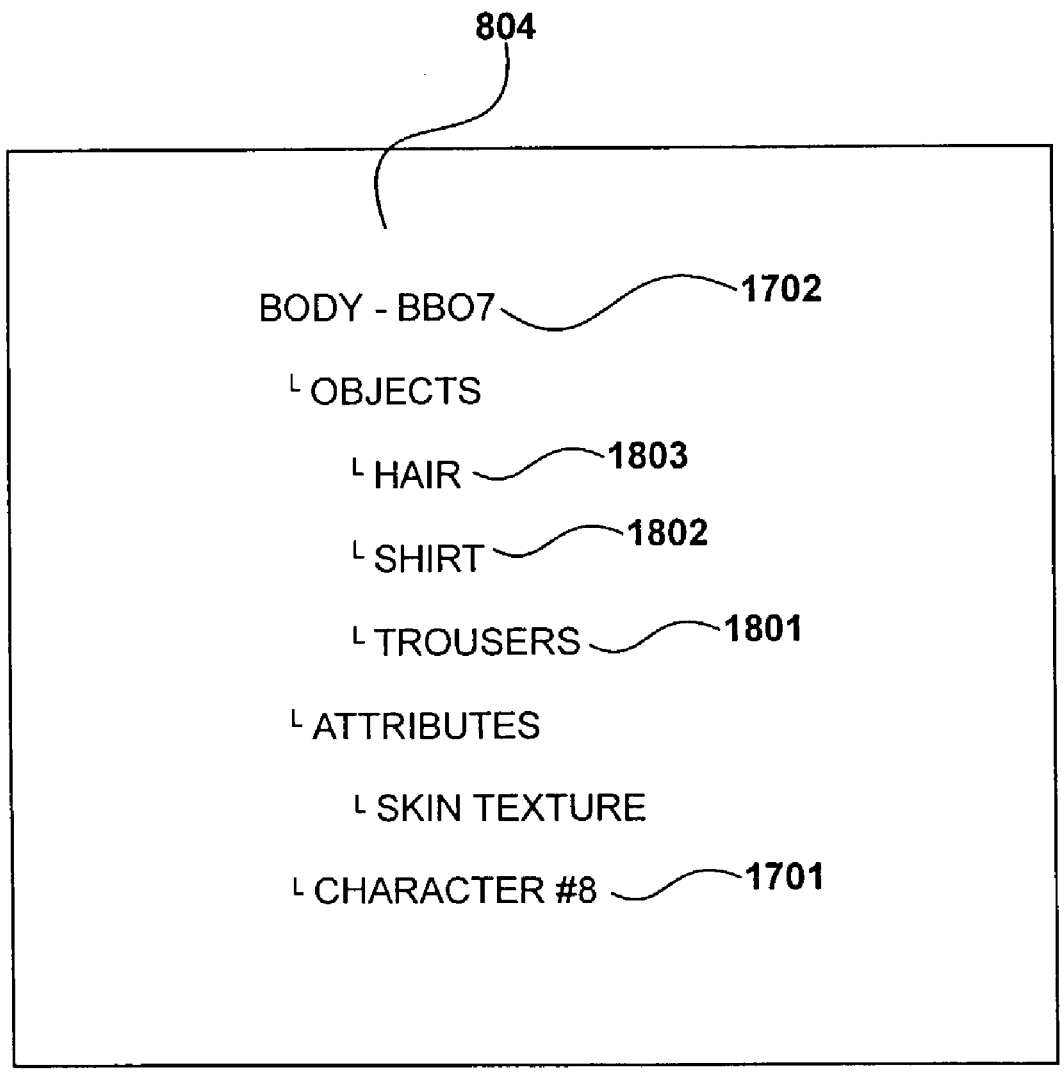
FIG. 18 shows the navigation window 804 after the user has double clicked on the label "BODY-BB07" 1702.

The navigation window 804 is shown in FIG. 18 after the user has double clicked on the label "BODY-BB07" 1702 in FIG. 17. Thus, the label 1702 is displayed at the top of the window 804 and it parent and children are represented by labels displayed below it.

The windows 802 and 803 (not shown in FIG. 18) remain unchanged in appearance and so continue to display creation tool icons and a view of the animation. While window 805 is updated to display appropriate editing tools The body of the character 1501 is one of several simulated objects in a group labelled "CHARACTER#8" which defines the character 1501. Consequently, "CHARACTER#8" is the parent of said body and so label 1701 is displayed below label 1702.

The simulated objects which provide the appearance of the trousers, shirt and hair of the character 1501 are constrained to the body and so they are children of the body. Thus labels 1801, 1802 and 1803 representing the trousers, shirt and hair are displayed below label 1702 representing the body.

As shown in the scene tree of FIG. 16, there are nine levels and thirty-three nodes in the hierarchy for the animation of FIG. 15. However, it will now be clear that the present invention limits the displayed information so that it is of a quantity that may be easily understood by the user. Furthermore the invention selects the information so that it is most relevant to the user's requirements.

What is claimed is:

1. Animation editing apparatus for editing animation data, said apparatus comprising a data storage, a processing device, a visual display and a manually responsive input device, wherein:
   said manually responsive input device is configured to allow a user to indicate a selected point on the visual display;
   said visual display is configured to display an image representing a simulated three-dimensional world-space including a simulated three-dimensional object comprised of a plurality of related simulated three-dimensional objects;
   said manually responsive input device is configured to provide an input signal indicating a location within said image corresponding to one of said plurality of related three-dimensional objects based on said selected point;
   said processing device is configured to identify said one of said plurality of related simulated three-dimensional objects in response to receiving said location indicated via said input signal, and to retrieve data from said data storage of one or more related items defining attributes related to said identified simulated three-dimensional object, wherein said attributes have hierarchy levels of a single predefined degree among degrees of relationships corresponding only to said identified simulated three-dimensional object at said location;
   said visual display is configured to display labels identifying said one of said plurality of simulated three-dimensional objects including said related items that are only within said predefined degree among a hierarchy containing each of said plurality of simulated three-dimensional objects.

2. Animation editing apparatus for editing animation data according to claim 1, wherein said defined degree of relationship is such that said displayed labels identify said selected object and items directly related only to said identified simulated three-dimensional object.

3. Animation editing apparatus for editing animation data according to claim 1, wherein said displayed related items include a parent item of said identified simulated three-dimensional object.

4. Animation editing apparatus for editing animation data according to claim 1, wherein said apparatus is configured such that said display identifies said identified simulated three-dimensional object as said identified simulated three-dimensional object.

5. Animation editing apparatus for editing animation data according to claim 1, wherein
   on receiving an input signal from said manually responsive input device indicating selection of one of said displayed labels, said processing device is configured to determine the identity of a selected item corresponding to said indicated displayed label, and said apparatus is configured such that said visual display displays labels identifying the selected item and items directly related to said selected item.

6. Animation editing apparatus for editing animation data according to claim 5, wherein when said selected item is an attribute, said apparatus is configured to display labels on said visual display identifying said simulated three-dimensional objects to which said attribute is applied.

7. Animation editing apparatus for editing animation data, said apparatus comprising a data storage, a processing device, a visual display and a manually responsive input device, wherein:
   said manually responsive input device configured to allow a user to indicate a selected point on the visual display;
   said visual display is configured to display an image representing a simulated three-dimensional world-space including a simulated three-dimensional object comprised of a plurality of related simulated three-dimensional objects;
   said manually responsive input device is configured to provide an input signal indicating a location within said image corresponding to one of said plurality of related simulated three-dimensional objects based on said selected point;
   said processing device is configured to identify said one of said plurality of related simulated three-dimensional objects in response to receiving said location indicated via said input signal, and to retrieve data from said data storage of one or more related items defining attributes related to said identified simulated three-dimensional object, wherein said attributes have hierarchy levels of a single predefined degree among degrees of relationships corresponding only to said identified simulated three-dimensional object at said location;
   said visual display is configured to display labels identifying said one of said plurality of simulated three-dimensional objects including said related items that are only within said predefined degree among a hierarchy containing each of said plurality of simulated three-dimensional objects; and
   said apparatus is such that when one of said displayed labels represents an attribute, and an input is received at said manually responsive input device indicating selection of the label representing said attribute, said apparatus is configured to display labels on said visual display identifying the selected attribute and each simulated three-dimensional object to which said attribute is applied.

8. Animation editing apparatus for editing animation data, said apparatus comprising a data storage, a processing device, a visual display and a manually responsive input device, wherein:

said manually responsive input device configured to allow a user to indicate a selected point on the visual display;

said visual display is configured to display an image representing a simulated three-dimensional world-space including a simulated three-dimensional object comprised of a plurality of related simulated three-dimensional objects;

said manually responsive input device is configured to provide an input signal indicating a location within said image corresponding to one of said plurality of related simulated three-dimensional objects based on said selected point;

said processing device is configured to identify said one of said plurality of related simulated three-dimensional objects in response to receiving said location indicated via said input signal, and to retrieve data from said data storage of one or more related items defining attributes related to said identified simulated three-dimensional object, wherein said attributes have hierarchy levels of a single predefined degree among degrees of relationships corresponding only to said identified simulated three-dimensional objects at said location;

said visual display is configured to display labels identifying said one of said plurality of simulated three-dimensional objects including said related items that are only within said predefined degree among a hierarchy containing each of said plurality of simulated three-dimensional objects; and said apparatus is configured such that when said selected simulated three-dimensional object is constrained to another simulated three-dimensional object, said displayed related items include said another simulated three-dimensional object.

9. A method of editing animation data in a data processing system, said system comprising a data storage, a processing device, visual display and manually responsive input device, comprising:

receiving a selected point indicated by a user on the visual display;

displaying an image representing a simulated three-dimensional world-space on said visual display, said world-space including a simulated three-dimensional object comprised of a plurality of related simulated three-dimensional objects;

receiving an input at said manually responsive input device indicating a location within said image corresponding to one of said plurality of related simulated three-dimensional objects based on said selected point;

identifying said one of said plurality of related simulated three-dimensional objects in response to receiving said input;

automatically retrieving data from said data storage of one or more related items defining attributes related to said identified simulated three-dimensional object, wherein said attributes have hierarchy levels of a single predefined degree among degrees of relationships corresponding only to said identified simulated three-dimensional object at said location; and displaying labels on said visual display identifying said one of said plurality of simulated three-dimensional objects including said related items that are only within said predefined degree among a hierarchy containing said plurality of simulated three-dimensional objects.

10. A method of editing animation data in a data processing system according to claim 9, wherein said defined degree of relationship is a direct relationship, such that said displayed labels identify said selected object and items directly related only to said identified simulated three-dimensional object.

11. A method of editing animation data in a data processing system according to claim 9, wherein said displayed related items include a parent item of said identified simulated three-dimensional object.

12. A method of editing animation data in a data processing system according to claim 9, wherein said display identifies said identified simulated three-dimensional object as said identified simulated three-dimensional object.

13. A method of editing animation data in a data processing system according to claim 9, wherein said method comprises:

receiving an input at said manually responsive input device indicating one of said displayed labels;

determining the identity of a selected item corresponding to said indicated displayed label; and automatically displaying labels on said visual display identifying the selected item and items directly related to said selected item of at least two hierarchal levels.

14. A method of editing animation data in a data processing system according to claim 13, wherein when said selected item is an attribute, said method comprises displaying labels on said visual display identifying the simulated three-dimensional objects to which said attribute is applied.

15. A method of editing animation data in a data processing system, said system comprising a data storage, a processing device, a visual display and manually responsive input device, comprising:

receiving a selected point indicated by a user on the visual display;

displaying an image representing a simulated three-dimensional world-space on said visual display, said world-space including a simulated three-dimensional object comprised of a plurality of related simulated three-dimensional objects;

receiving an input at said manually responsive input device indicating a location within said image corresponding to one of said plurality of related simulated three-dimensional objects based on said selected point;

identifying said one of said plurality of related simulated three-dimensional objects in response to receiving said input;

retrieving data from said data storage of one or more related items defining attributes related to said identified simulated three-dimensional object, wherein said attributes have hierarchy levels of a single predefined degree among degrees of relationships corresponding only to said identified simulated three-dimensional object at said location; and displaying labels on said visual display identifying said one of said plurality of simulated three-dimensional objects including said related items that are only within said predefined degree among a hierarchy containing each of said plurality of simulated three-dimensional objects, and wherein said method is such that one of said displayed labels represents an attribute and an input is received at said manually responsive input device indicating selection of the label representing said attribute said method comprises:

displaying labels on said visual display identifying the selected attribute and each simulated three-dimensional object to which said attribute is applied.

16. A computer readable medium having computer readable instructions executable by a computer such that, when executing said instructions, a computer will perform the operation of:
   display an image representing a simulated three-dimensional world-space on a visual display means, said world-space including a simulated three-dimensional object comprised of a plurality of related simulated three-dimensional objects;
   receive an input at a manually responsive input device indicating a location within said image corresponding to one of said plurality of related simulated three-dimensional objects based on said selected point;
   identify said one of said plurality of related simulated three-dimensional objects in response to receiving said input;
   automatically retrieve data from said data storage means of one or more related items defining attributes related to said identified simulated three-dimensional object, wherein said attributes have hierarchy levels of a single predefined degree among degrees of relationships corresponding only to said identified simulated three-dimensional objects at said location; and
   display labels on said visual display means to identify said one of said plurality of related simulated three-dimensional objects including said related items that are only within said predefined degree among a hierarchy containing each of said plurality of related simulated three-dimensional objects.

17. Animation editing apparatus for editing animation data, said apparatus comprising data storage means, processing means, visual display means and a manually responsive input device configured to allow a user to indicate a selected point on the visual display means, wherein:
   said manually responsive input device configured to allow a user to indicate a selected point on the visual display means;
   said visual display means is configured to display an image representing a simulated three-dimensional world-space including a simulated three-dimensional object comprised of a plurality of related simulated three-dimensional objects;
   said manually responsive input device is configured to provide an input signal indicating a location within said image corresponding to one of said plurality of related simulated three-dimensional objects based on said selected point;
   said processing means is configured to identify said one of said plurality of related simulated three-dimensional objects in response to receiving said location indicated via said input signal, and to automatically retrieve data from said data storage means of one or more directly related items defining attributes and wherein said directly related items are directly related to said identified simulated three-dimensional object, wherein said attributes have hierarchy levels of a single predefined degree among degrees of relationships corresponding only to said one of the simulated three-dimensional objects at said location, and such that said directly related items include the parent item of said selected object; and
   said visual display means is configured to display labels identifying said one of the simulated three-dimensional objects including said directly related items that are only within the predefined degree among a hierarchy containing each of said plurality of simulated three-dimensional objects.

18. Animation editing apparatus for editing animation data according to claim 17, wherein
   on receiving an input signal from said manually responsive input device indicating one of said displayed labels, said processing means is configured to determine the identity of a selected item corresponding to said indicated displayed label, and said apparatus is configured such that said visual display means displays labels identifying the selected item and items directly related to said selected item.

19. Animation editing apparatus for editing animation data according to claim 18, wherein when said selected item is an attribute, said apparatus is configured to display labels on said visual display means identifying the simulated three-dimensional objects to which said attribute is applied.

20. Animation editing apparatus for editing animation data, said apparatus comprising a personal computer having data storage, a processor, a visual display unit and a manually responsive input device, wherein:
   said manually responsive input device is configured to allow a user to indicate a selected point on the visual display;
   said visual display unit is configured to display an image representing a simulated three-dimensional world-space including a simulated three-dimensional object comprised of a plurality of related three-dimensional simulated objects;
   said manually responsive input device is configured to provide an input signal indicating a location within said image corresponding to one of said plurality of related three-dimensional simulated objects based on said selected point;
   said processor is configured to identify said one of said plurality of related three-dimensional simulated objects in response to receiving said location indicated via said input signal, and to automatically retrieve data from said data storage of one or more related items defining attributes related to said identified simulated three-dimensional object, wherein said attributes have hierarchy levels of a single predefined degree among degrees of relationships corresponding only to said identified three-dimensional simulated objects at said location; and
   said visual display unit is configured to display labels identifying said one of said plurality of simulated three-dimensional objects including said related items that are only within the predefined degree among a hierarchy containing each of said plurality of simulated objects, wherein
   on receiving a further input signal from said manually responsive input device indicating one of said displayed labels, said processor is configured to determine the identity of a selected item corresponding to said indicated displayed label, and said apparatus is configured such that said visual display unit displays labels identifying the selected item and items directly related to said selected item.

21. Animation editing apparatus for editing animation data according to claim 20, wherein when said selected item is an attribute, said apparatus is configured to display labels on said visual display unit identifying the simulated three-dimensional objects to which said attribute is applied.

22. A method of editing animation data in a data processing system, said system comprising a data storage, a processing device, a visual display and a manually responsive input device, comprising:
- receiving a selected point indicated by a user on the visual display;
- displaying an image representing a simulated three-dimensional world-space on said visual display, said world-space including a simulated three-dimensional object comprised of a plurality of related simulated three-dimensional objects;
- receiving an input at said manually responsive input device indicating a location within said image corresponding to one of said plurality of related simulated three-dimensional objects based on said selected point;
- identifying said one of said plurality of related simulated three-dimensional objects in response to receiving said input;
- automatically retrieving data from said data storage of one or more related items defining attributes related to said identified simulated three-dimensional object, wherein said attributes have hierarchy levels of a single pre-defined degree among degrees of relationships corresponding only to said identified simulated three-dimensional object at said location; and
- providing a user interface displaying the identified simulated three-dimensional object and only said at least one or more stored related item that has editable features in a display view.

* * * * *

UNITED STATES PATENT AND TRADEMARK OFFICE
CERTIFICATE OF CORRECTION

PATENT NO. : 7,692,657 B2  Page 1 of 1
APPLICATION NO. : 10/313170
DATED : April 6, 2010
INVENTOR(S) : Andre Gauthier It is certified that error appears in the above-identified patent and that said Letters Patent is hereby corrected as shown below:

Column 4, Line 23, Change "SHERE1" to --SPHERE1--
Column 4, Line 23, Change "SHERE2" to --SPHERE2--
Column 6, Line 34, Change "Thus" to --Thus,--
Column 6, Line 45, Change "tools" to --tools.--
Column 6, Line 67, Change "event" to --events,--
Column 9, Line 17, Change "tools" to --tools.--

Signed and Sealed this

Seventeenth Day of August, 2010

David J. Kappos
*Director of the United States Patent and Trademark Office*